(12) United States Patent
McCabe

(10) Patent No.: US 6,596,108 B2
(45) Date of Patent: Jul. 22, 2003

(54) WEB VELOCITY MODULATOR

(75) Inventor: John A McCabe, Sheboygan Falls, WI (US)

(73) Assignee: Curt G. Joa, Inc., Sheboygan Falls, WI (US)

( * ) Notice: Subject to any disclaimer, the term of this patent is extended or adjusted under 35 U.S.C. 154(b) by 63 days.

(21) Appl. No.: 09/973,761

(22) Filed: Oct. 10, 2001

(65) Prior Publication Data

US 2003/0066585 A1 Apr. 10, 2003

(51) Int. Cl.⁷ .............................................. B29C 65/08
(52) U.S. Cl. .................. 156/73.1; 156/290; 156/308.4; 156/580.1
(58) Field of Search .......................... 156/64, 731, 157, 156/290, 308.2, 308.4, 361, 502, 504, 580.1, 580.2; 242/552

(56) References Cited

U.S. PATENT DOCUMENTS

| | | | |
|---|---|---|---|
| 3,526,563 A | | 9/1970 | Schott, Jr. |
| 3,816,210 A | * | 6/1974 | Aoko et al. ................. 156/290 |
| 3,883,389 A | | 5/1975 | Schott, Jr. |
| 4,003,298 A | | 1/1977 | Schott, Jr. |
| 4,165,666 A | | 8/1979 | Johnson et al. |
| 4,236,955 A | | 12/1980 | Prittie |
| 4,342,206 A | | 8/1982 | Rommel |
| 4,642,839 A | | 2/1987 | Urban |
| 4,777,513 A | | 10/1988 | Nelson |
| 4,987,940 A | | 1/1991 | Straub et al. |
| 5,096,532 A | | 3/1992 | Neuwirth et al. |
| 5,109,767 A | | 5/1992 | Nyfeler et al. |
| 5,110,403 A | | 5/1992 | Ehlert |
| 5,127,981 A | | 7/1992 | Straub et al. |
| 5,131,525 A | | 7/1992 | Musschoot |
| 5,407,513 A | | 4/1995 | Hayden et al. |
| 5,421,924 A | | 6/1995 | Ziegelhoffer et al. |
| 5,424,025 A | | 6/1995 | Hanschen et al. |
| 5,545,275 A | | 8/1996 | Herrin et al. |
| 5,552,013 A | | 9/1996 | Ehlert et al. |
| 5,628,738 A | | 5/1997 | Suekane |
| 5,693,165 A | | 12/1997 | Schmitz |
| 5,746,869 A | | 5/1998 | Hayden et al. |
| 5,788,797 A | | 8/1998 | Herrin et al. |
| 5,817,199 A | | 10/1998 | Brennecke et al. |
| 5,932,039 A | * | 8/1999 | Popp et al. .................... 156/64 |
| 5,964,970 A | * | 10/1999 | Woolwine et al. ............ 156/64 |
| 6,074,110 A | | 6/2000 | Verlinden et al. |
| 6,123,792 A | | 9/2000 | Samida et al. |
| 6,183,576 B1 | | 2/2001 | Couillard et al. |

OTHER PUBLICATIONS

Ingenious Mechanisms pp. 292–295, Industrial Press, 12th printing 1964.

* cited by examiner

*Primary Examiner*—James Sells
(74) *Attorney, Agent, or Firm*—Ryan Kromholz & Manion, S.C.

(57) ABSTRACT

A process and apparatus related to a workstation adjacent to a traveling web including a device for intermittently performing an operation affecting the web. An important application involves ultrasonically welding multiple layers of a traveling web. First and second rollers on opposite sides of the workstation are simultaneously shifted in a direction counter to the machine direction each time a bonding force is applied. The overall running speed in the machine remains at a constant velocity due to the resultant festooning effect and thus the dwell time for bonding is increased. Thus the effective operating speed of processed having finite limits may be increased at least 33%. The first and second rollers are eccentrically rotationally mounted, respectively, on third and fourth hollow rollers which are provided with eccentrically positioned hollow cylindrical openings which, in turn, are mounted, respectively, on shafts positioned perpendicularly to the machine direction. Shifting of the rollers is effected by simultaneous rotation of the rollers. Preferably, the first and second rollers are driven synchronously in a first rotational direction and the third and fourth rollers are driven synchronously in the opposite rotational direction.

24 Claims, 11 Drawing Sheets

WEB VELOCITY MODULATOR

BACKGROUND OF THE INVENTION

The present invention relates to apparatus for modulating the speed of a traveling web. More particularly the invention relates to apparatus for enabling a workstation to operate on a traveling web for an increased period of time by temporarily decreasing the velocity of the section of web as it passes through the workstation or operational zone where it is acted upon as a part of the processing of the web.

An example of a process wherein the invention is applicable is in the production and manufacture of disposable products such as pants-type diapers or protective undergarments. It is often necessary that bonds be created transverse to the machine-direction of a web used to form such products. These bonds might, for instance, be required to effect the side-seal on protective undergarments. Additionally, these products might require that a number of layers of materials be bonded securely, creating a bond with a high mechanical strength.

The types of nonwoven fabrics normally used in disposable articles may have inherent thermal bonding characteristics, but multiple layers of this material tend to act as thermal insulators, inhibiting the rapid penetration of heat to the innermost layers. This insulating quality may limit the ability of simple heat and pressure from producing effective bonds at reasonable production speeds. Typical protective undergarment assemblies may have areas of four, six or even eight layers of material to be bonded.

One method of thermo-mechanical bonding commonly employed involves the application of ultrasonic energy to the web between an ultrasonic actuator horn which engages the web assembly while it is supported on its opposite side by a patterned anvil. This method applies bonding energy to all layers of the web simultaneously in what is effectively a hammer-forging process. A series of very rapid, very intense hammer blows results in a very localized form of heat and pressure, transmitted to every layer of the material. When enough hammer blows are applied with sufficient intensity, the materials fuse into a well integrated laminate.

A common method of applying such ultrasonic energy to a moving web is to pass the web between a vibrating, but otherwise stationary ultrasonic horn and a drum-shaped rotating anvil which is provided with a plurality of patterned tools around its periphery. The tools are spaced apart according to the product pitch (i.e., length of individual product web segments) in the machine direction.

It can be appreciated that each configuration of material, numbers of layers of material and bonding pattern employed in various products may require a minimum number of ultrasonic hammer blows to create an acceptable bond. Further, it can be appreciated that the speed with which the web passes through the bonding zone between hammer and anvil limits the number of blows that can be applied at a given hammer frequency. Given the dimensions of a particular web, a maximum attainable ultrasonic hammer vibrational frequency and a limited effective hammer width, it can be seen that there will be a maximum web speed at which effective bonds can be reliably produced. In view of these considerations, it will be appreciated that a need has existed for processes and apparatus for increasing the effective speed of such procedures.

SUMMARY OF THE INVENTION

The invention provides processes and apparatus designed to increase the speed at which a web can be processed through an intermittent work station such as an ultrasonic bonding device. The apparatus serves to modulate the velocity of the web segment worked on at the bonding station, slowing it during that part of the cycle during which bonds are to be produced, so that the bonds may be effected at a velocity lower than the nominal web velocity. Festooning systems are commonly used to either stop or reduce the velocity of a moving web at a selected location in a process. This invention provides the benefits of festooning without the disadvantages normally associated with linear motion mechanisms.

In accordance with a preferred embodiment of this invention, the speed controlling effect is produced by moving two web transporting rollers located on opposite sides of the bonding device, ie., upstream from and downstream from the bonding device, in concert with one another and in a line of motion parallel to the machine direction of the traveling web. In this embodiment, each roller is configured to produce a linear displacement by rotating an outer cylinder with an internal eccentric bore about a shaft which is provided with an equally eccentric outer surface. The shaft is rotated synchronously to and in the opposite direction of the outer cylinder. Inasmuch as the amounts of eccentricity are equal and due to the fact that they are rotating in opposite directions, the additive displacements are such that motion appears to be linear and applied in a single radial direction.

Briefly summarized, according to one important aspect, the invention provides process and apparatus which modifies the speed of a travelling web so that it can have an operation performed on it at a workstation at a desirably reduced velocity while maintaining a high overall web velocity. An important such operation consists of ultrasonically bonding the layers of a web which contains thermoplastic materials such as non-woven fibers. First and second process roller assemblies located at the entry and exit points of an ultrasonic bonding device are simultaneously and cycloidally shifted along a line tangential to the bonding point. The first and second process roller assemblies are each equipped with eccentric mechanisms, which are in turn mounted on second supporting eccentric mechanisms such as shafts or hollow cylinders, which are rotated about equally eccentric centers. The process rollers of the first and second roller assemblies are rotated in the direction of the web passing over them, while the first and second supporting mechanisms are rotated in directions opposite those of their respective rollers. Each roller and each supporting eccentric mechanism is synchronously rotated, so that each makes one revolution per product length. As each eccentric mechanism rotates relative to its respective counter-rotating roller, the directional displacements of the eccentricities are canceling in one axis, while they are additive in another, perpendicular axis. This arrangement imparts a festooning motion to the web, wherein its velocity varies cycloidally by an amount dependent on the amount of eccentric displacement. This festooning effect is, thus, achieved by simultaneously shifting the first and second roller assemblies in a direction counter to the machine direction each time a bonding force is applied or other operation performed. The overall running speed in the machine remains at a constant velocity while the dwell time for bonding operation is increased.

In a preferred embodiment the first and second rollers of each roller assembly are eccentrically rotationally mounted, respectively, on third and fourth hollow rollers which are provided with eccentrically positioned hollow cylindrical openings which, in turn, are mounted, respectively, on shafts positioned perpendicularly to said machine direction. Shifting of the rollers is effected by simultaneous rotation of the eccentric mechanisms.

In accordance with further aspects of the invention, the same process and apparatus is applicable to various other operations conducted with respect to a traveling web at a work station. Such operations can include mechanical bonding, thermal bonding, crimping, stamping, embossing, printing, spraying, heating, irradiation, cutting, sewing, application of additional layers or appendages, or a myriad of similar operations, as will be appreciated by those skilled in the art.

As used herein, "thermo-mechanical bonding" refers to ultrasonic bonding procedures and to other processes that use a combination of heat and pressure to unify or bond together a plurality of layers of a web of bondable material. Ultrasonic horn devices are intended to be excited at frequencies ranging from about 18 to about 60 kHz. Such devices are known in the art and do not form a direct part of this invention. Details of such devices are set forth, for example, in U.S. Pat. No. 5,096,532 to Neuwirth et al, issued Mar. 17, 1992 and in the references cited in said patent disclosure. See also U.S. Pat. No. 5,421,924 issued Jun. 6, 1995 to Ziegelhoffer et al.

DETAILED DESCRIPTION OF THE INVENTION

Figure 1:
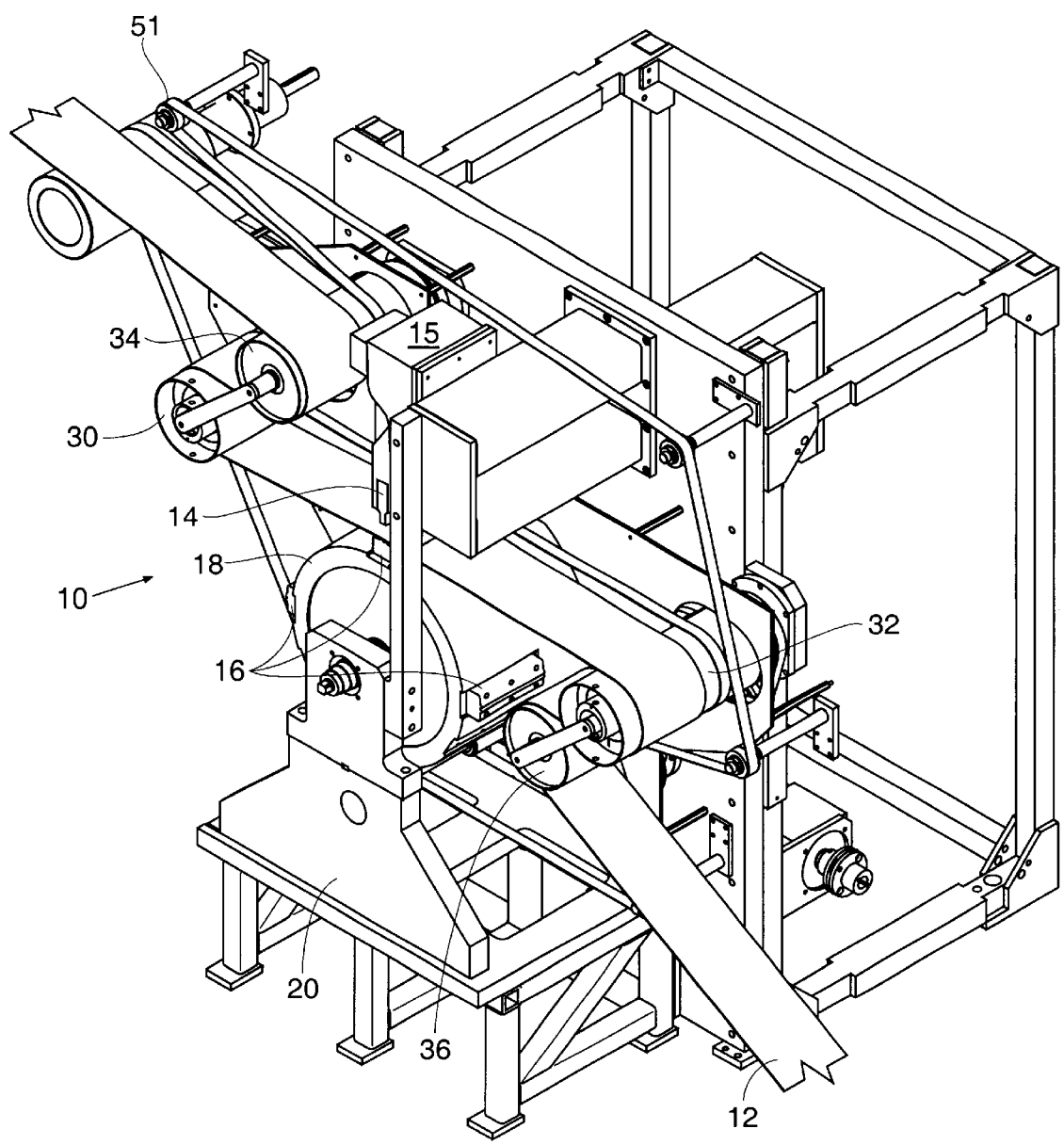
FIG. 1 is an isometric view showing a web layer bonding device incorporating a web velocity modulating unit in accordance with the invention.
Figure 2:
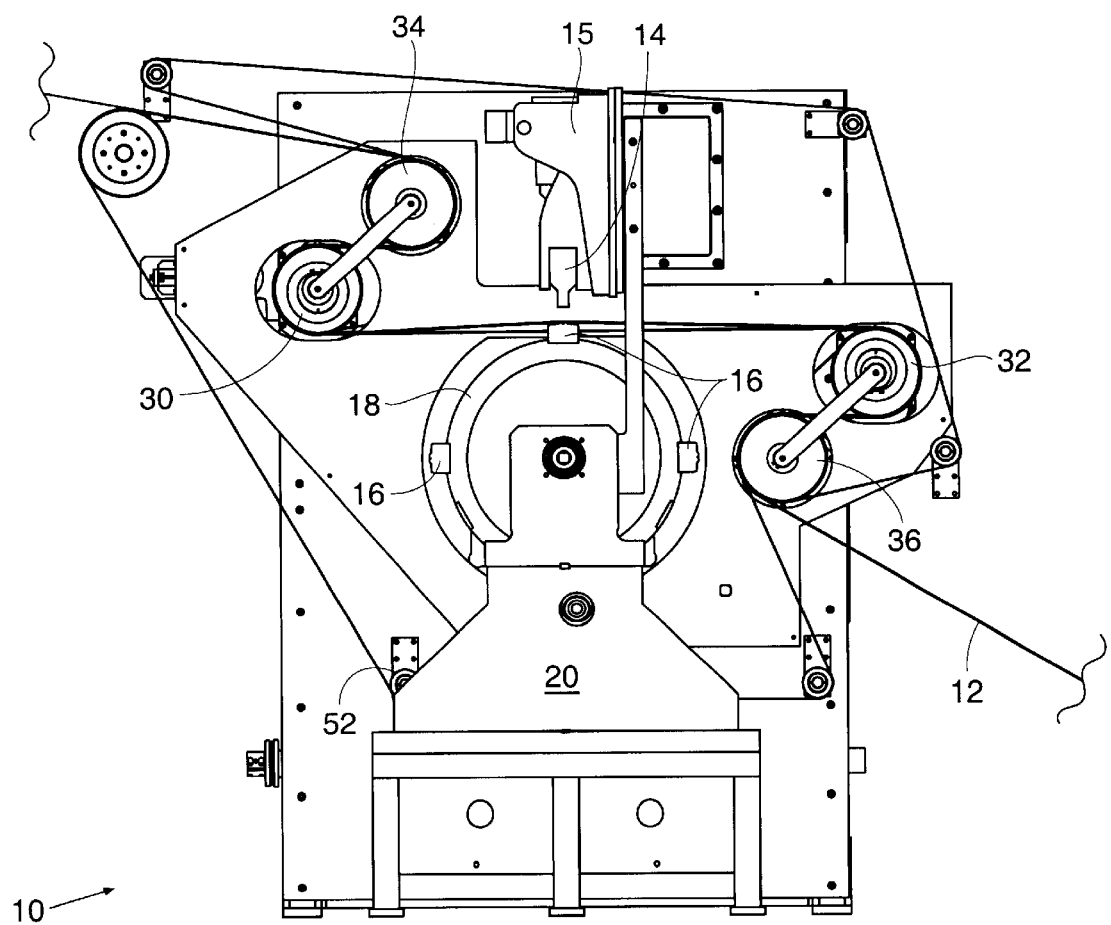
FIG. 2 is a side elevational view of the apparatus of FIG. 1.

Referring more particularly to the drawings, numeral 10 represents a web bonding station wherein multiple layers of a web 12 are ultrasonically bonded to each other by means of an oscillating ultrasonic horn 14. In accordance with conventional practice, the ultrasonic horn 14 vibrates at an extremely high frequency, usually in the range of 20,000 hertz, to, in effect, repeatedly hammer the layers which form the web 12 against an anvil 16 at intermittent locations spaced along the length of the web as illustrated in FIGS. 1 and 2. Web 12 is typically of a spun bonded polypropylene or similar thermoplastic polymer. Anvils 16 are spaced at equal intervals around a rotatable supporting drum 18. Generally, three to six anvils 16 may be provided on the rotary drum 18, but in the illustrated preferred embodiment four such anvils are provided. As seen, drum 18 is rotatably supported on a frame member 20. A commercially available ultrasonic actuating device 15 is also mounted to the machine framework and supports and drives the ultrasonic hammer 14.

A pair of double eccentric roller mechanisms 30 and 32 of this invention are mounted upstream and downstream from the ultrasonic horn 14. Roller assemblies 30 and 32 are associated with idler rollers 34 and 36, respectively. As explained in greater detail hereinafter, the roller assemblies 30 and 32 are operated to impart a cycloidally varying velocity to the traveling web 12. The oscillating effect of the rollers 30 and 32 is synchronized so that the web 12 approximates its lowest velocity as one of the anvils 16 travels into alignment with the ultrasonic horn 14.

Figure 3:
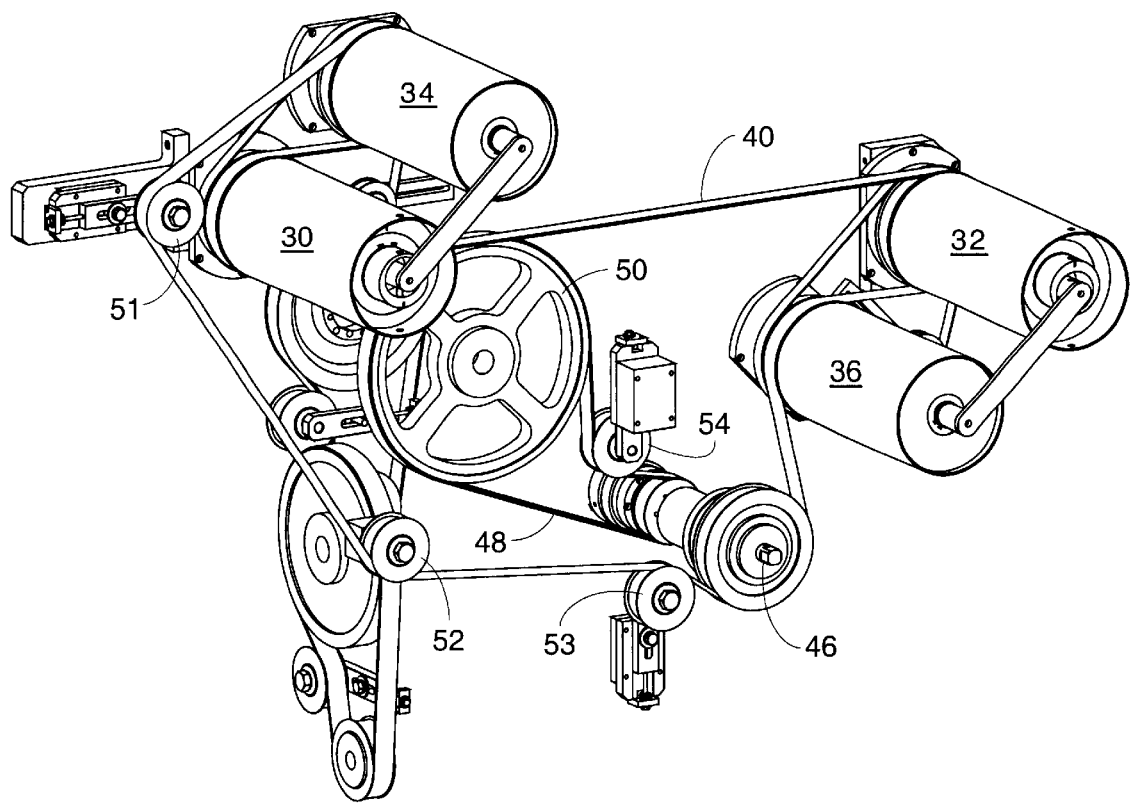
FIG. 3 is an isometric view of the web velocity modulating unit incorporated in FIG. 1 illustrated as a separate unit for purposes of clarity in conjunction with a drive mechanism used in conjunction therewith.
Figure 4:
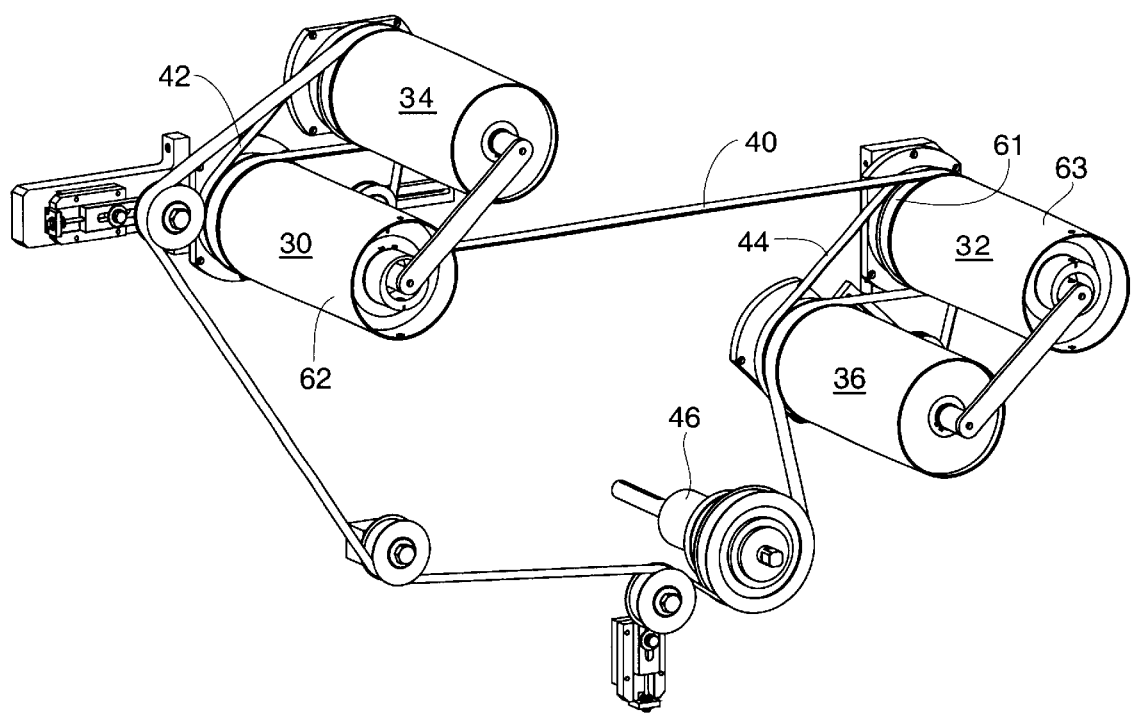
FIG. 4 is a perspective view of the web velocity modulating unit of FIG. 3 with some of the drive units removed for further clarity.
Figure 8:
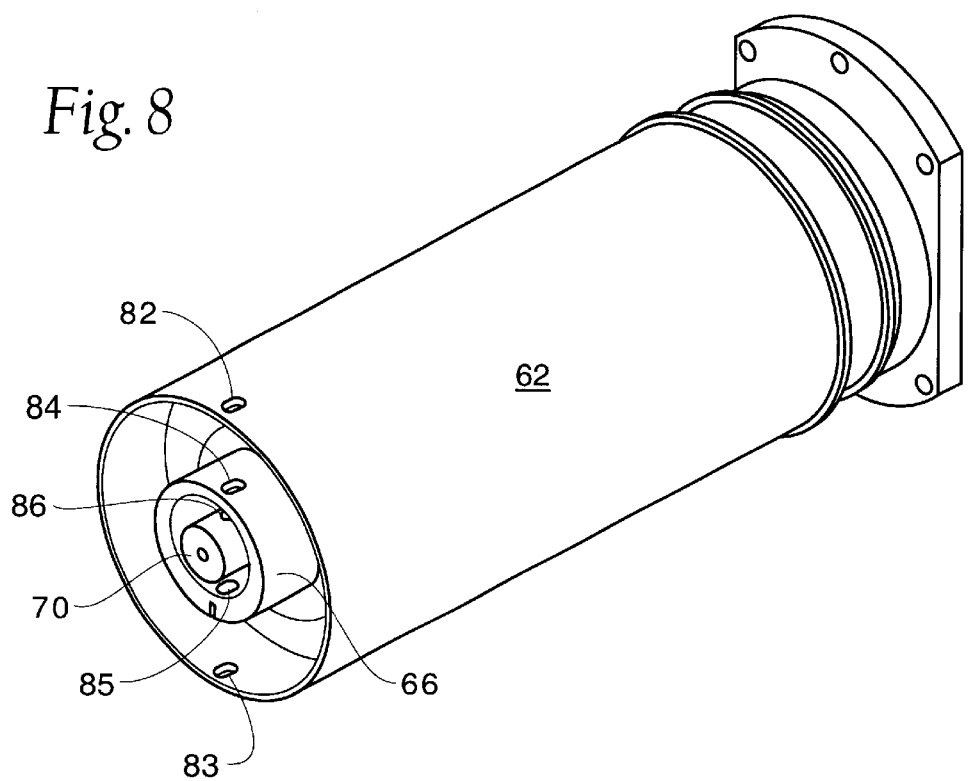
FIG. 8 is an isometric view of a single dual eccentric roller used in the practice of the invention.

Referring to FIGS. 3 and 4, there is shown a drive belt 40 for synchronously rotating the outer perimeter of each of the roller assemblies 30 and 32. Referring to FIG. 10, assembly 30 includes an outer peripheral surface member 62 which is integral with a sheave 60 that is driven by belt 40. A similar sheave 61 is integral with the outer periphery 63 of assembly 32. It will be understood that while FIGS. 8–10 show the details of a single roller assembly 30 for purpose of illustration, that the internal details the other roller assembly 32 are substantially identical.

Also, as seen in FIGS. 3 and 4, the belt 40 is driven by a power-driven pulley and shaft assembly 46. Conventional adjustable idlers such as those numbered 51, 52 and 53 are also illustrated and are used for adjusting the tension of belt 40 in customary fashion. Also seen in FIGS. 3 and 4 are drive belts 42 and 44 used to engage sheave 64 which is integral with an intermediate rotatable eccentric member 66 in the roller assembly 30. In the illustrated embodiment, as best seen in FIG. 10, the inner supporting shaft member 70 is stationary and rotatably supports the inner member 66 through roller bearings 72. Intermediate eccentric cylinder member 66 in turn rotatably supports the outer peripheral member 62 through roller bearings 74. Belts 42 and 44 are synchronously driven in an opposite rotational directions from belt 40 so that the assembly components 62 and 66 rotate in opposite rotational directions relative to each other.

Figure 5:
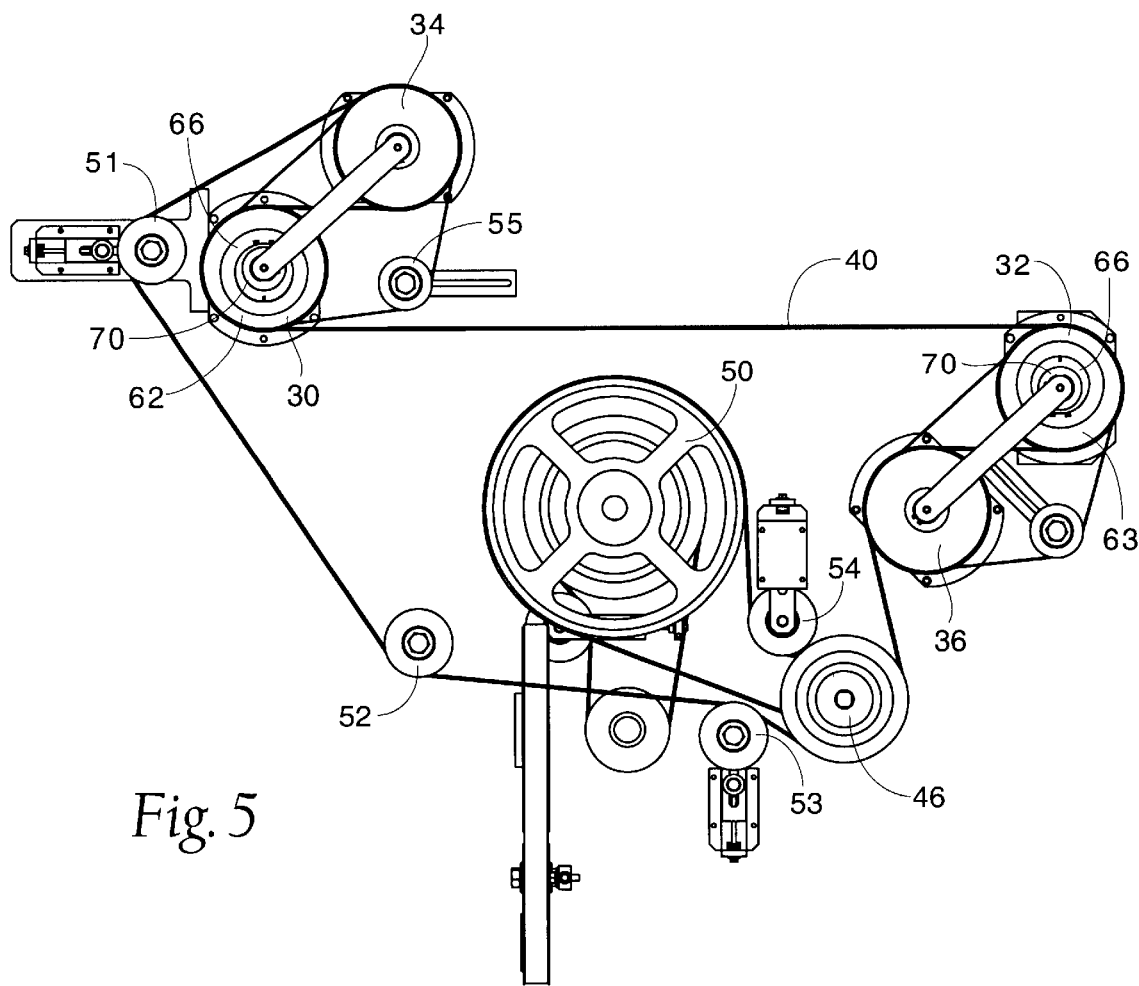
FIG. 5 is a side elevational view of the apparatus shown in FIG. 3.

Also seen in FIGS. 3 and 5 is a driven pulley 50 which is affixed to rotatable drum 18, the rotation of which is also, accordingly, synchronized with the rotation and movement of roller assemblies 30 and 32.

Figure 9:
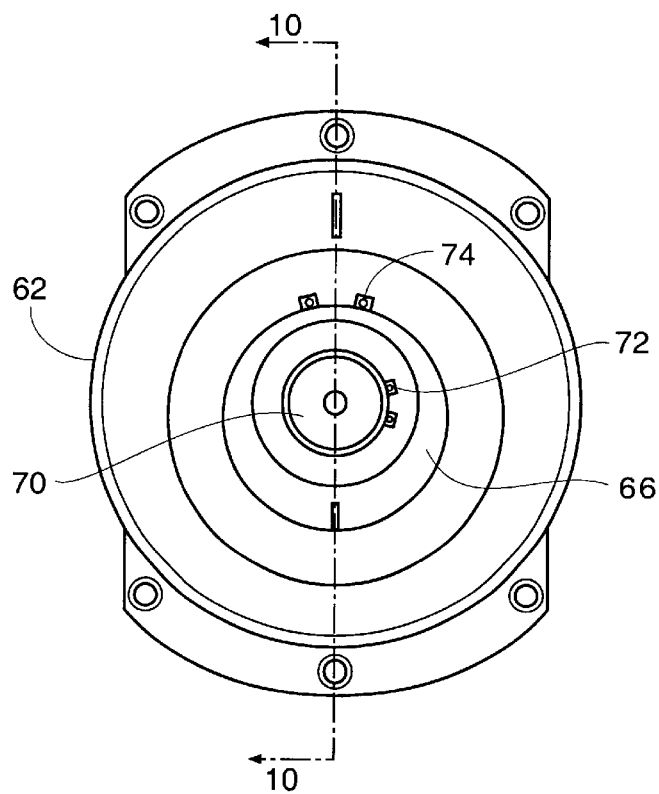
FIG. 9 is an end elevational view of the roller assembly of FIG. 8.
Figure 10:
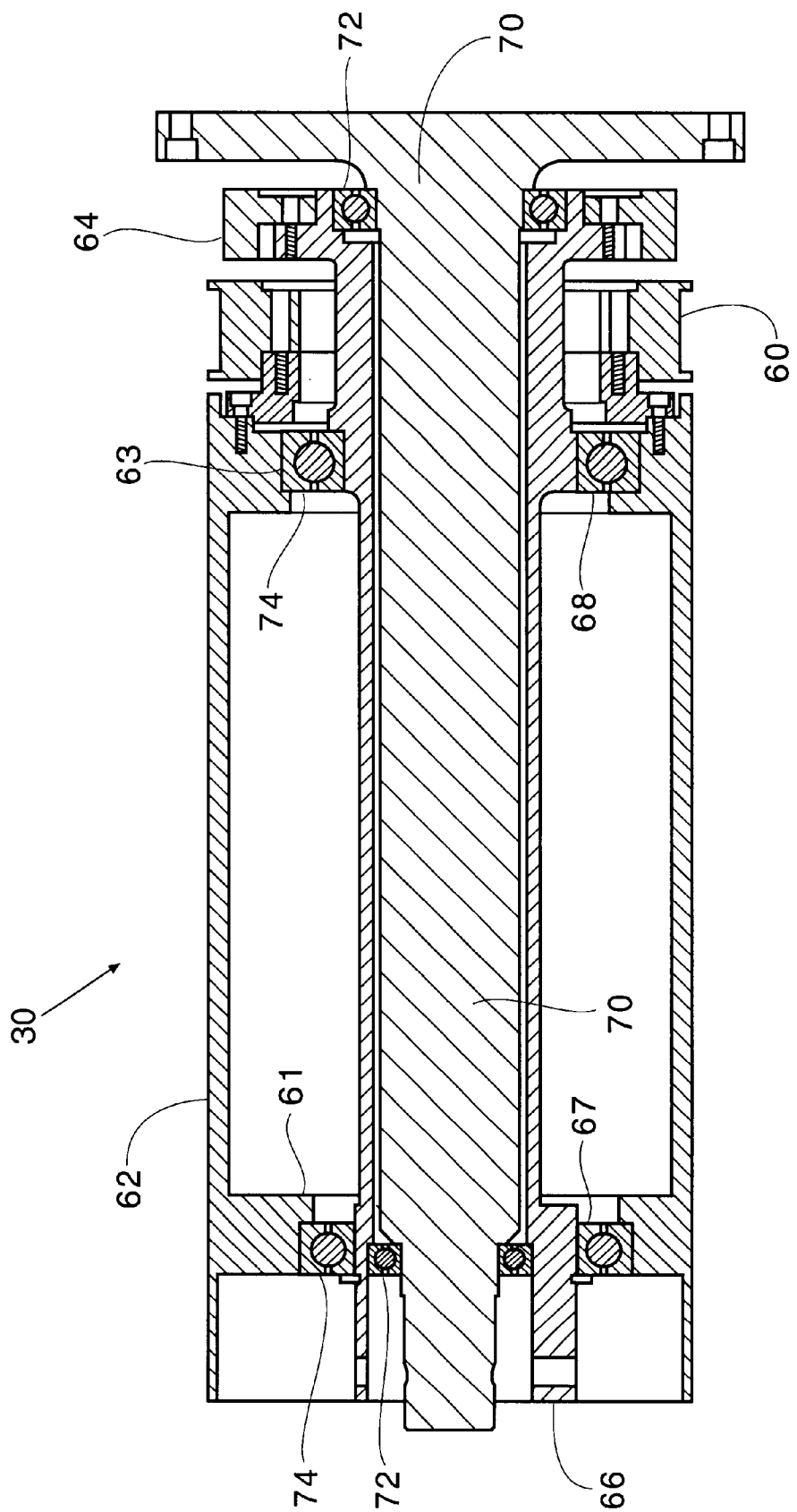
FIG. 10 is a central sectional view of the roller assembly shown in FIGS. 8 and 9 taken along Line 10–10 of FIG. 9; and, FIG. 11 is a central sectional view of a roller assembly in accordance with a further embodiment of the invention.

As best seen in FIGS. 9 and 10, the internal bearing surfaces 61 and 63 of outer roller perimeter 62 are eccentric relative to the circular outer perimeter of the roller 62. Similarly, the bearing surfaces 67 and 68 of the middle roller components 66 are also eccentric relative to the central axis of member 66.

Figure 6:
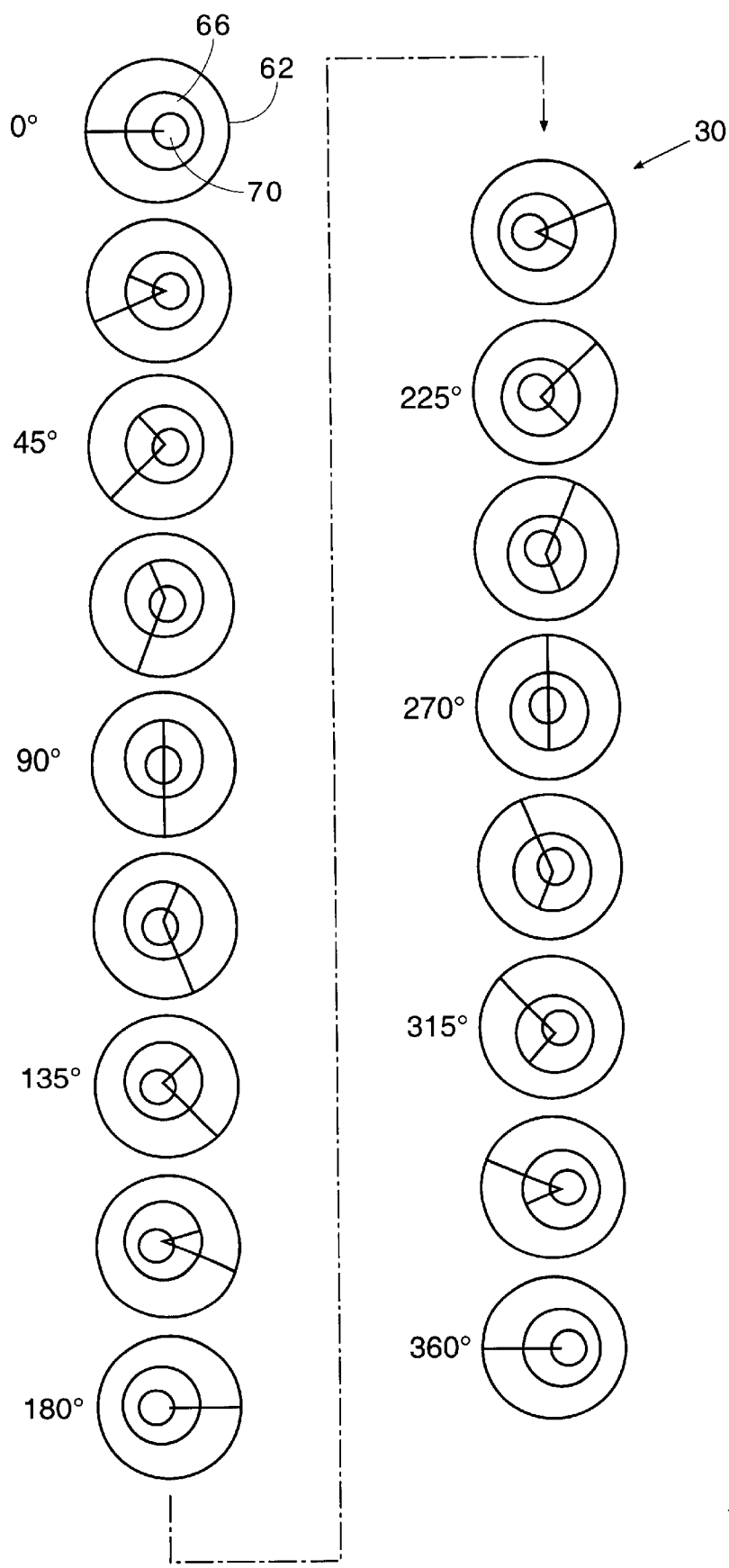
FIG. 6 is a series of end views of a dual eccentric roller assembly used in conjunction with the invention showing the relative positions thereof during the course of one full revolution.

Referring to FIG. 6 the effect of the counter revolving double eccentric 62 and 66 around stationary shaft 70 is illustrated. In the zero degree position, as well as the 360 degree position, the double eccentric members are shown rotated to a position wherein the left peripheral surface viewed in FIG. 6 is at a position of maximum leftward extension. As the combined eccentrics rotate through the 45-degree position to the 90-degree position, the amount of leftward projection diminishes until, at 90 degrees rotation, it reaches zero. In this position, the peripheral surface of the outer roller assembly surface 62 extends equally to the right and left of the axial center of stationary member 70. Then, as rotation continues through the 135-degree position, the assembly outer peripheral surface 62 has extended to the right of the axis of the central shaft 70. The maximum rightward extension occurs at the point where both of the eccentric components 62 and 66 have moved to the right of the center of component 70, at 180 degrees.

It will be noted, then, that as the assembly 30 continues to rotate from the 180-degree position of maximum rightward extension, the degree of such extension diminishes until there is once again equal rightward and leftward extension at the 270-degree rotational point. Then, as the full 360-degree rotational cycle is complete, the cylindrical surface has once again extended the maximum amount leftward.

Figure 7:
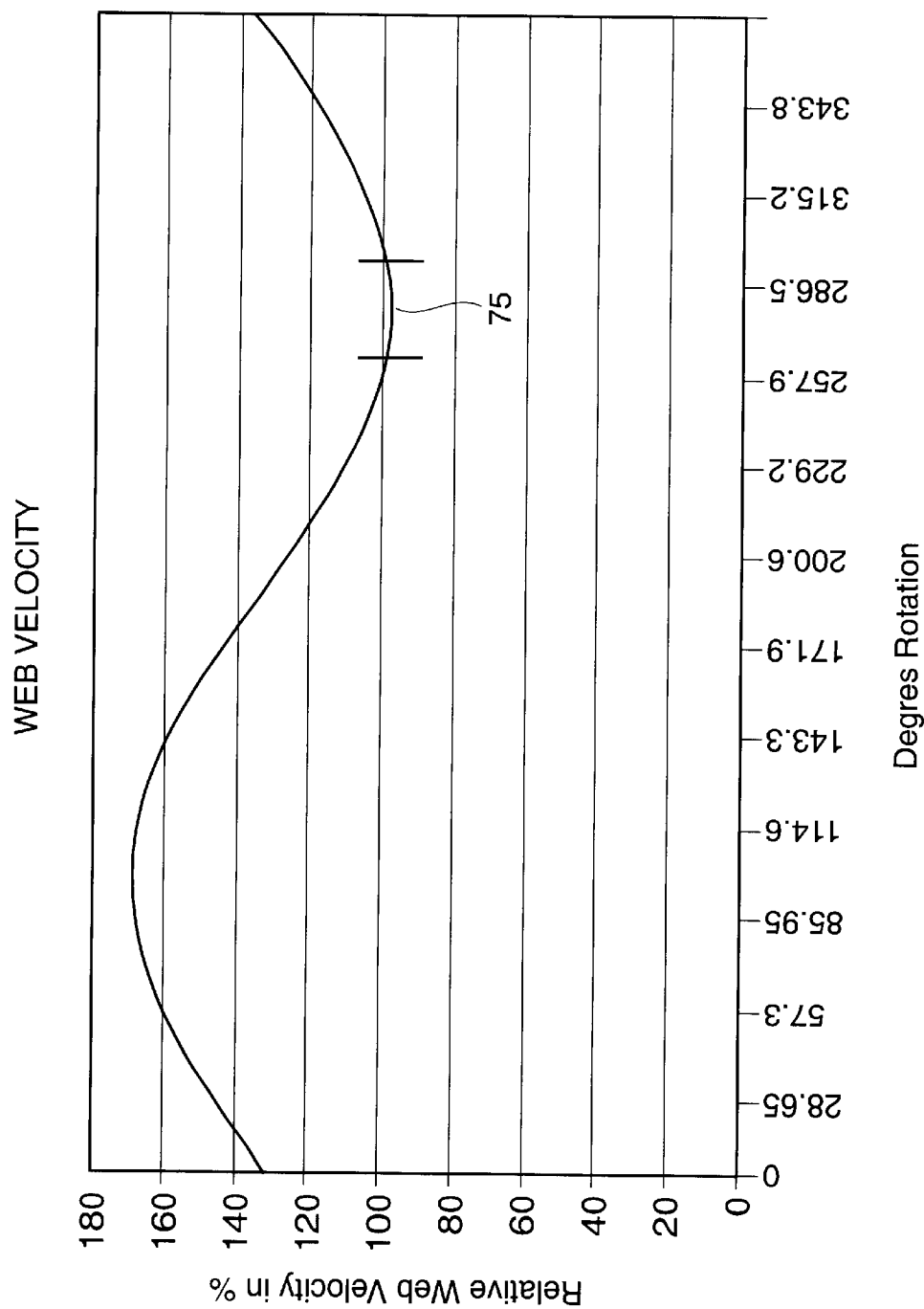
FIG. 7 is a graphical representation showing the web velocity relative to the bonder velocity at various degrees of rotation of the eccentric rollers illustrated in FIG. 6.

It will be understood that each of the roller assemblies 30 and 32 travels through the same cycle shown in FIG. 6 synchronously so that the effect on the web 12 travelling over the two rollers is an oscillating effect causing the web velocity to increase and decrease during each revolution of the roller assemblies. This effect is depicted in FIG. 7 wherein the relative web velocity in percent of bonder velocity is plotted against rotation of the assembly. An interval 75 of most reduced velocity is utilized by having it coincide with the point of travel of the equipment wherein an anvil 16 is in alignment with the ultrasonic horn 14. Since the average speed is higher than the bonding speed, a higher number of bonds per minute can be produced. Thus an increase of at least 33% of the effective operating speed of a bonding process is attainable.

Figure 5A:
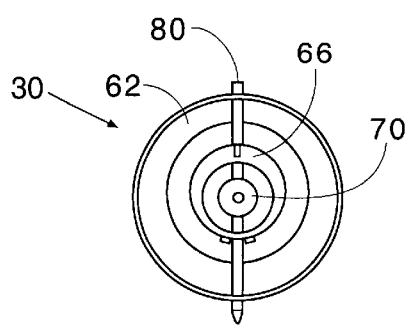
FIG. 5A is an end view showing a tool eccentric roller in conjunction with a set-up alignment pin.

Referring to FIG. 5a, a preferred technique for set up alignment of the roller assemblies 30 and 32 is shown. In order to place the roller assemblies into proper alignment, an alignment pin 80 is utilized. For that purpose, alignment holes 82 and 83 are provided through the outer roller element 62. Similar openings 84 and 85 are provided through the intermediate roller member 66 while a cooperating aperture is also provided through the center of shaft 70. The pins 80 are used during the set-up of the equipment, only, and are, of course, removed when the equipment is placed into operation so that the various components are able to rotate relative to each other.

During the motion caused by the eccentric rollers in accordance with the invention, the effective linear velocity of the web, thus, follows a sinusoidal pattern which is 90 degrees out of phase with the web displacement. During the advancing motion the web velocity reaches a peak at the crest of the sine curve because the linear velocity is compounded and added to the nominal web velocity. During the retractive motion of the rollers, the linear velocity is again compounded but is subtracted from the nominal velocity and reaches a low point represented by the trough of the curve. As with any sinusoidal curve, it can be seen that the amplitude varies most rapidly as it moves through its zero or mid-point. It will also be noted that the amplitude varies only slightly within a few degrees of the crest and trough. The present invention thus takes advantage of this attribute during the bonding period. During a period of dwell of approximately 20 to 30 degrees, illustrated by interval 75, the web 12 velocity approximates the velocity of the bonding anvil 16.

Figure 11:
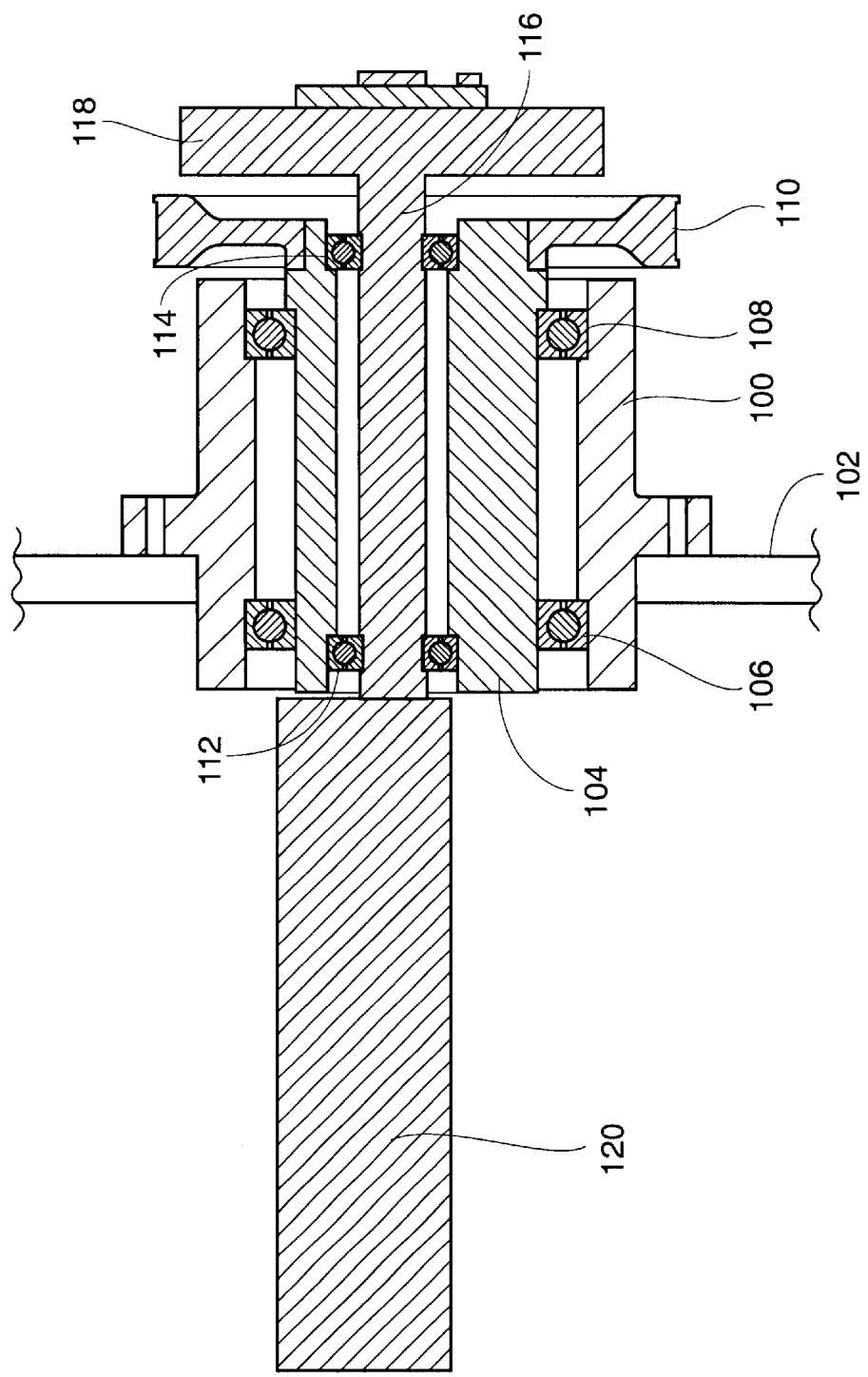

A limitation of the foregoing preferred embodiment results from the fact that the outer circumference of the roller assemblies 30 and 32 must be equal to one product pitch or length along web 12. In the case where relatively short product pitches are required, the resulting diameters of the roller assembly components may be too small to accommodate a reasonable amount of eccentricity. In such cases a second embodiment illustrated in FIG. 11 may be utilized. In the embodiment of FIG. 11 the fixed component is outside of the eccentric components and the central shaft is made part of the rotatable roller assembly. Referring the FIG. 11, it is seen that an outer stationary housing 100 which is affixed to a stationary surface 102 is provided. An intermediate eccentric rotatable member 104 is supported in outer housing 100 by bearings 106 and 108. Within intermediate member 104 bearings 112 and 114 rotatably support a rotatable shaft member 116. A web transporting roller member 120 is eccentrically attached to the shaft 116. As in the case of the earlier embodiment, sheave or pulley surfaces 110 and 118 are provided to enable rotation of the members 116 and 104 in opposite rotational directions. It will thus be appreciated that the necessary degree of eccentricity is attainable even for short product pitch lengths.

Figure 12:
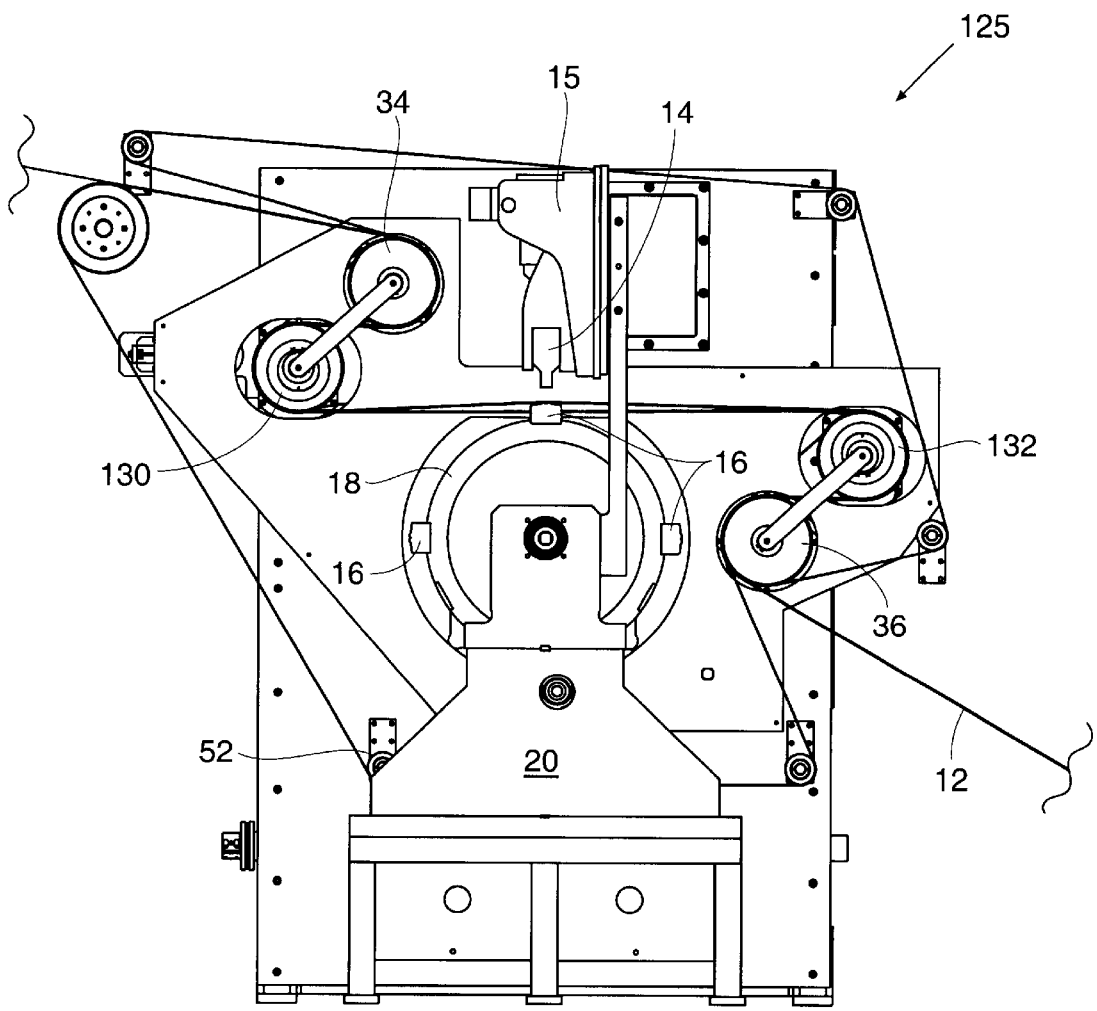
FIG. 12 is a side elevational view of apparatus illustrating a further embodiment of the invention.

In FIG. 12 the same numbers are given to the same components of the apparatus as used in connection with the earlier described embodiments of the invention. As shown, modified apparatus 125 includes eccentric rollers 130 and 132 which are located on opposite sides, upstream and downstream, respectively, of ultrasonic hammer 14 and its actuating device 15. Each of the rollers 130 and 132 are rotated about axes offset from their centers in order to provide an oscillating motion caused by synchronous revolution of the rollers 130 and 132, each of which has a single degree of eccentricity. In this case, the rollers 130 and 132 are placed 180° out of phase so that the web 12 is caused to move with a reduced velocity each time the hammer 14 aligns with an anvil 16 and is actuated. The web velocity is then caused to increase above its nominal velocity at times when the hammer 14 is not being actuated.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A process for intermittently performing an operation on a web traveling in a machine direction at a substantially constant velocity comprising providing a workstation adjacent to said traveling web, said workstation including a device for performing an operation affecting said web intermittently at locations separated along said web in said machine direction, providing first and second roller assemblies displaced from each other and located, in the machine direction, on opposite sides of said work station, said roller assemblies both being in driving contact with said traveling web, intermittently actuating said device to perform said operation on said web at intervals spaced apart in the machine direction, simultaneously shifting said first and second roller assemblies in a direction counter to said machine direction each time said device is actuated while maintaining the overall running speed in said machine direction at a constant velocity, whereby the dwell time is increased for each actuation of said device, and simultaneously shifting said first and second roller assemblies back in the machine direction after completion of each application of said operation.

2. A process according to claim 1 wherein said first and second roller assemblies each include eccentric cylinder components mounted on first and second associated stationary shafts and said shifting is effected by synchronous rotation of said first and second roller assemblies.

3. A process according to claim 1 wherein said first and second roller assemblies are driven by a single drive belt reeved around drive surfaces provided on both of said first and second roller assemblies.

4. A process according to claim 3 wherein said first and second roller assemblies include first and second outer cylindrical members which are eccentrically rotationally mounted, respectively, on third and fourth hollow rollers which are provided with eccentrically positioned hollow cylindrical openings which, in turn, are mounted, respectively, on shafts positioned perpendicularly to said machine direction, and movement of said contact surfaces in and opposite to the machine direction is effected by simultaneous rotation of said first and second roller assemblies to synchronously extend and retract said contact surfaces.

5. A process according to claim 4 wherein said first and second rollers are driven synchronously in a first rotational direction and said third and fourth rollers are driven synchronously in an opposite rotational direction.

6. A process according to claim 5 wherein said first and second rollers are both driven by a first drive belt and said third and fourth rollers are driven by separate synchronously driven drive belts.

7. A process according to claim 1 wherein said device comprises an ultrasonic bonding device for welding together a plurality of layers of material in said web.

8. A process according to claim 4 wherein said roller assemblies each include an outer stationary member within which a first eccentric member rotates in a first rotational direction and second member rotates within an opening through said first eccentric member, said second member being integral with an eccentrically disposed surface and rotates in a second rotational direction opposite to said second rotational direction.

9. A process according to claim 4 wherein said web comprises layers of non-woven polypropylene material.

10. A process according to claim 2 wherein said first and second roller assemblies each comprise a roller having an eccentrically located rotation axis and said rollers rotate eccentrically about said axis in a 180° out of phase relationship whereby the velocity of a web segment moving between said rollers is intermittently increased and decreased.

11. A process according to claim 1 wherein said device comprises a thermal-mechanical bonding device for thermally welding together a plurality of layers of said material in said web.

12. Apparatus for intermittently performing an operation on a web traveling in a machine direction at a substantially constant velocity comprising a workstation adjacent to said traveling web, said workstation including a device for performing an operation affecting said web intermittently at locations separated along said web in said machine direction, first and second roller assemblies displaced from each other and located, in the machine direction, on opposite sides of said workstation, said roller assemblies each having contact surfaces adapted to be in driving contact with said traveling web, said first and second roller assemblies being configured for simultaneous shifting of said contact surfaces in a direction counter to said machine direction each time said device is actuated and for simultaneous movement of said first and second roller assemblies back in the machine direction after completion of each actuation of said device while maintaining the overall running speed in said machine direction at a constant velocity, whereby the dwell time is increased for each actuation of said device.

13. Apparatus according to claim 12 wherein said first and second roller assemblies each include a first inner cylindrically shaped component which is eccentrically rotatably mounted on an inner shaft positioned perpendicularly to said machine direction and a second outer cylindrically shaped component which defines said contact surface is rotatably eccentrically mounted on said first inner cylindrically shaped component and movement of said contact surfaces in and opposite to the machine direction can be effected by simultaneously rotating said first and second cylindrically shaped components in opposite rotational directions to extend and retract said contact surfaces synchronously in the machine direction.

14. Apparatus according to claim 12 wherein said second cylindrically shaped components are each eccentrically mounted on an associated stationary shaft.

15. Apparatus according to claim 14 wherein said first cylindrically shaped components of said first and second roller assemblies are synchronously driven by a single drive belt reeved around drive surfaces provided on each of said first cylindrically shaped components.

16. Apparatus according to claim 12 wherein each of said roller assemblies each comprise first and second rotatable eccentric members, the each of said second eccentric members is rotatably disposed within said first eccentric member and around a related third member, and, means are provided for synchronously rotating said first and second rotatable eccentric members in opposite rotational directions at the same rotational velocity, each of said eccentric members being rotatable one full revolution during each actuation of said workstation device.

17. Apparatus according to claim 16 wherein said first and second rotatable eccentric members are each hollow cylinders provided with an eccentrically positioned hollow cylindrical opening which, in turn, is mounted on a stationary shaft positioned perpendicularly to said machine direction.

18. Apparatus according to claim 12 wherein said roller assemblies each include an outer stationary member within which a first eccentric member rotates in a first rotational direction and second member rotates within an opening through said first eccentric member, said second member being integral with an eccentrically disposed surface and rotates in a second rotational direction opposite to said second rotational direction.

19. Apparatus according to claim 17 wherein said first rotatable eccentric members of each of said first and second roller assemblies are both driven by a single drive belt.

20. Apparatus according to claim 12 wherein said workstation device comprises an ultrasonic bonding device for ultrasonically welding together a plurality of layers of material in said web.

21. Apparatus according to claim 12 wherein said workstation device comprises a thermal-mechanical bonding device for thermally welding together a plurality of layers of material in said web.

22. Apparatus for ultrasonically welding together a plurality of layers of a web traveling in a machine direction at a constant velocity comprising an intermittently actuatable ultrasonic bonding device adjacent to the path of and adapted to contact said traveling web, first and second roller assemblies displaced from each other and located, in the machine direction, on opposite sides of said ultrasonic bonding device, said roller assemblies each having contact surfaces adapted to be in driving contact with said traveling web, each of said first and second roller assemblies including a first hollow roller provided with an eccentrically positioned hollow cylindrical opening which is, in turn, mounted on a second hollow roller provided with an eccentrically positioned hollow cylindrical opening, said latter hollow cylindrical opening being rotationally mounted on a shaft positioned perpendicularly to said machine direction, movement of said contact surfaces in and opposite to the machine direction being effected by synchronously rotation of said hollow rollers, in opposite rotational directions at the same rotational velocity, each of said eccentric rollers being rotatable one full revolution during each actuation of said ultrasonic bonding device, thereby reducing the velocity of said web adjacent to said bonding device during actuation thereof while maintaining overall web running speed in said machine direction at a constant velocity.

23. Apparatus according to claim 22 wherein said roller assemblies each include an outer stationary member within which a first eccentric member rotates in a first rotational direction and second member rotates within an opening through said first eccentric member, said second member being integral with an eccentrically disposed surface and rotates in a second rotational direction opposite to said second rotational direction.

24. Apparatus according to claim 22 wherein said device comprises a thermal-mechanical bonding device for thermally welding together a plurality of layers of said material in said web.

* * * * *